United States Patent
Tojner

(10) Patent No.: US 6,319,295 B1
(45) Date of Patent: Nov. 20, 2001

(54) PROCESS AND DEVICE FOR CLEANING A DUST SEPARATOR

(75) Inventor: Franz Tojner, Haag (AT)

(73) Assignee: Kappa Arbeitsschutz & Umwelttechnik GmbH, Steyr (AT)

( * ) Notice: Subject to any disclaimer, the term of this patent is extended or adjusted under 35 U.S.C. 154(b) by 0 days.

(21) Appl. No.: 09/509,924

(22) PCT Filed: Oct. 9, 1998

(86) PCT No.: PCT/AT98/00239

§ 371 Date: Apr. 4, 2000

§ 102(e) Date: Apr. 4, 2000

(87) PCT Pub. No.: WO99/20370

PCT Pub. Date: Apr. 29, 1999

(30) Foreign Application Priority Data

Oct. 17, 1997 (AT) .................................. A 1762/97

(51) Int. Cl.[7] .................................................. B01D 46/04
(52) U.S. Cl. ................ 55/302; 55/283; 55/303; 95/278; 95/280
(58) Field of Search ................. 55/290, 302, 303, 55/283; 95/278, 280

(56) References Cited

U.S. PATENT DOCUMENTS

| | | | | |
|---|---|---|---|---|
| 3,421,295 | * | 1/1969 | Swift et al. | 55/302 |
| 4,445,913 | * | 5/1984 | Nishiyama | 55/302 |
| 4,452,616 | * | 6/1984 | Gillingham et al. | 55/302 |
| 4,468,240 | * | 8/1984 | Margraf | 55/302 |
| 4,504,293 | * | 3/1985 | Gillingham et al. | 55/302 |
| 4,812,149 | * | 3/1989 | Griffin et al. | 55/302 |
| 5,529,592 | * | 6/1996 | Margraf | 55/302 |

FOREIGN PATENT DOCUMENTS

| | | |
|---|---|---|
| 23 45 722 | 3/1975 | (DE) . |
| 25 50 918 | 5/1977 | (DE) . |
| 43 34 699 | 11/1994 | (DE) . |
| 31 11 502 | 9/1995 | (DE) . |
| 0 089 114 | 9/1983 | (EP) . |
| 2 740 702 | 5/1997 | (FR) . |
| 1 060 594 | 3/1967 | (GB) . |

* cited by examiner

*Primary Examiner*—David A. Simmons
*Assistant Examiner*—Minh-Chau T. Pham
(74) *Attorney, Agent, or Firm*—Collard & Roe, P.C.

(57) ABSTRACT

There is described a method and an apparatus for cleaning a dust separator which has a raw gas shaft (3), through which raw gas flows from the top to the bottom, and filter elements (5) protruding into the raw gas shaft (3) transverse to the raw gas flow, by which filter elements the raw gas is deflected into a clean gas shaft (4) under a corresponding separation of dust, and which filter elements are briefly subjected to compressed air one after the other for blowing off the dust particles deposited on the same into the raw gas shaft (3), where during the application of compressed air onto the filter elements (5) their flow connection to the clean gas shaft (4) is interrupted. To ensure a good cleaning effect, it is proposed that during the interruption of the flow connection between the filter elements (5) and the clean gas shaft (4) a raw gas stream having a flow component directed from the top to the bottom flows around the filter elements (5) blocked against the clean gas shaft (4).

8 Claims, 7 Drawing Sheets

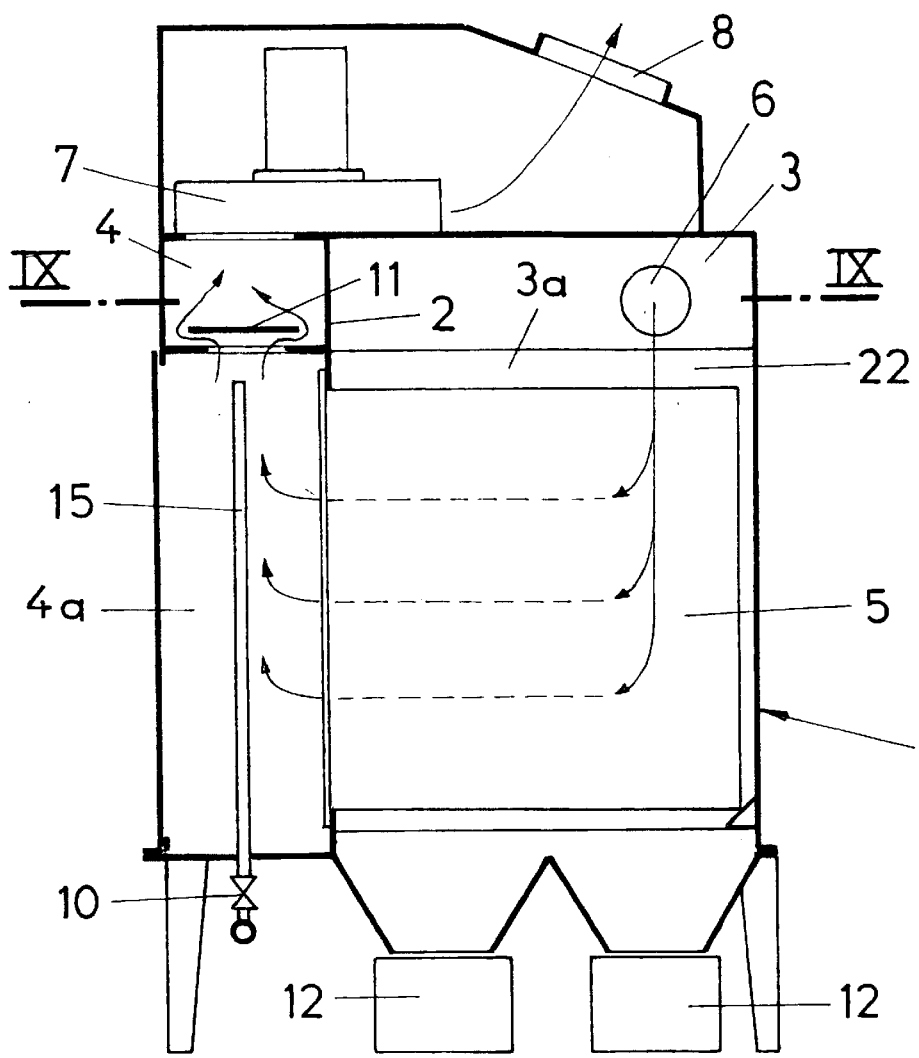
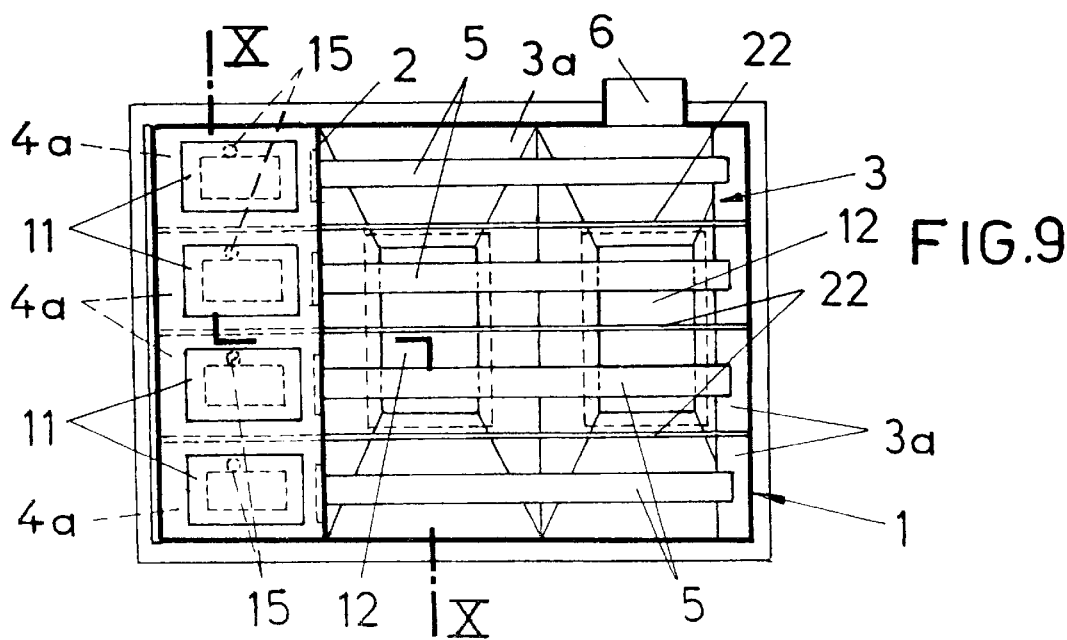

PROCESS AND DEVICE FOR CLEANING A DUST SEPARATOR

BACKGROUND OF THE INVENTION

1. Field of the Invention

This invention relates to a method of cleaning a dust separator which has a raw gas shaft, through which raw gas flows from the top to the bottom, and filter elements protruding into the raw gas shaft transverse to the raw gas flow, by which filter elements the raw gas is deflected into a clean gas shaft under a corresponding separation of dust, and which filter elements are briefly subjected to compressed air one after the other for blowing off the dust particles deposited thereon into the raw gas shaft, where during the application of compressed air onto the filter elements their flow connection to the clean gas shaft is interrupted, as well as to an apparatus for performing the method.

2. Description of the Prior Art

In dust separators with a raw gas shaft, which accommodates filter elements, usually filter cartridges, that are connected to a clean gas shaft, the dust-laden raw gas introduced into the raw gas shaft flows through the filter surfaces into the filter elements, from where they are sucked off as clean gas via the common clean gas shaft. To be able to remove the dust particles retained during the passage of raw gas from the filter surfaces during the operation of the filter, it is known to briefly subject the clean gas shaft to compressed air in certain intervals, so that by means of the pulses of compressed air in the individual filter elements the dust particles are blown off from the filter surfaces of the filter elements into the raw gas shaft. To prevent in this connection that the dust particles blown off from the filter elements have to be discharged from the raw gas shaft in downward direction against the raw gas stream usually passed through the raw gas shaft from the bottom to the top, the filter elements of a known dust separator are arranged in groups one above the other in a horizontal orientation, so that in the case of a raw gas flow inside the raw gas shaft from the top to the bottom the coarse-grained fraction of the dust that has been blown off can be moved downwards by the raw gas stream. This is possible because the coarse-grained fraction of the dust is accelerated when it is blown off and due to its inertia is moved away from the filter surface so far that in the case of a flow reversal by the raw gas fraction again flowing through the filter surface after the pulse of compressed air, it is no longer attached to the cleaned filter surface. Due to the friction behavior relevant for the movement of the fine fraction of the dust, which is characterized by a small Reynolds number (e.g. $Re_{particle}<30$), the movement of the fine dust particles is substantially determined by the gas flow. This means that the fine dust particles, which were blown off from the filter surfaces by the pulse of compressed air only to a comparatively small extent, are again attached to the filter surfaces of the filter elements by means of the raw gas stream directly subsequent to the pulses of compressed air, which leads to an increasing pressure loss and thus to a decreasing filter performance with the result that after certain operating periods the dust separator must be shut off for cleaning the filter elements. By means of a scavenging air flow through the filter elements against the raw gas flow the fine dust fraction can naturally be blown off from the filter surfaces of the filter elements and be discharged from the raw gas shaft without raw gas flow, but not during the operation of the filter.

Moreover, it is known (DE 31 11 502 A1, DE 43 34 699 C1) to block the filter elements against the clean gas shaft during the application of compressed air. Filter elements vertically lying one above the other are combined to groups, so that in the vicinity of such vertical group of filter elements there cannot be formed a raw gas flow from the top to the bottom. To make things worse, the filter elements which are disposed laterally beside the filter elements vertically lying one above the other and subjected to compressed air are likewise separated from the clean gas shaft during the application of compressed air onto the filter elements lying therebetween, which prevents the formation of a suction flow in the vicinity of these filter elements disposed one beside the other. This means that merely the coarse-grained fraction of the dust blown off can be discharged downwards due to a corresponding sinking speed, but not the fine-grained fraction, which during the subsequent connection of the filter elements to the suction of the clean gas shaft is again sucked towards the filter elements.

SUMMARY OF THE INVENTION

It is therefore the object underlying the invention to eliminate these deficiencies and provide a method of cleaning a dust separator as described above such that also the fine dust fraction can largely be removed from the filter elements during the operation of the filter.

This object is solved by the invention in that during the interruption of the flow connection between the filter elements and the clean gas shaft a raw gas stream having a flow component directed from the top to the bottom flows around the filter elements blocked against the clean gas shaft.

Since as a result of these measures the filter elements blocked against the clean gas shaft remain in a raw gas stream directed from the top to the bottom, not only the coarse dust particles flung off at a larger distance due to their greater inertia, but also the fine dust particles in the direct vicinity of the filter surfaces are downwardly entrained by the raw gas stream, which ensures the desired cleaning of the filter elements, because the fine dust particles are no longer sucked towards the filter elements during the connection of the cleaned filter elements to the clean gas shaft.

When the filter elements are at least arranged in groups one above the other, it is therefore recommended to apply compressed air onto the filter elements one after the other from the top to the bottom, so that the filter elements are progressively cleaned from the top to the bottom during the operation of the filter. Because of the downward flow of the raw gas decreasing in the vicinity of the bottommost filter elements, the cleaning effect described above can develop only incompletely in the bottommost filter elements. In these bottommost filter elements a higher dust loading must therefore be expected, which influences, however, the entire filter performance only to a comparatively small extent.

As has already been explained above, it is of decisive importance for the invention that the raw gas flow carries away the dust particles blown off during the pressurization of the filter elements from the cleaned filter surface, so that when the flow connection between the clean gas shaft and the filter elements blocked for the application of compressed air is opened, the raw gas fractions again flowing through the open filter elements can no longer deposit the dust particles blown off at the cleaned filter surfaces. To be able to satisfy this request even when the filter elements are disposed one beside the other, the raw gas stream is divided by means of partitions between the filter elements into partial streams associated to the filter elements at least in groups, which partial streams ensure a further downward movement of the dust particles blown off from the filter elements. In this connection it should be considered that despite the blocking of a filter element, a raw gas flow will be produced between the partitions fluidically delimiting this filter element against the filter elements disposed one beside the other, when the partitions form downwardly open flow passages, as this is absolutely necessary for discharging the dust particles blown off. In the vicinity of the flow passages having a flow connection at their lower end a negative pressure is produced as compared to the upper inflow side of these passages, which negative pressure effects a raw gas flow from the top to the bottom in the vicinity of the blocked filter element.

To improve the cleaning effect by applying compressed air onto the filter elements, the filter elements blocked against the clean gas shaft can be subjected to at least two successive pulses of compressed air, so that by means of the subsequent pulses of compressed air dust particles still adhering to the filter elements can likewise be blown off from the filter surfaces. The time of blocking the filter elements must be adjusted to the raw gas flow, which is produced during such blocking and flows around the filter elements from the top to the bottom, in order to ensure a sufficient transport of dust particles.

For performing the inventive method a known dust separator may be employed, which is provided with a raw gas shaft having a raw gas connection at its upper end, into which raw gas shaft filter elements protrude, which are disposed transverse to the raw gas flow and are attached to a clean gas shaft connected with a suction blower, with a compressed-air source for supplying pulses of compressed air to the groups of filter elements, with at least one shut-off means for successively closing the flow connections of the groups of filter elements to the clean gas shaft, and with at least one valve for connecting the filter elements to the compressed-air source. In such dust separator, the filter elements may be combined to groups disposed one above the other, in order to ensure the desired cleaning by blowing off the dust from the groups of filter elements into the raw gas stream, because the raw gas stream directed from the top to the bottom is maintained via the groups of filter elements not blocked against the clean gas shaft.

When the filter elements in the raw gas shaft are not disposed in groups one above the other, but are disposed one beside the other, the raw gas shaft must be divided into flow passages which are open at their upper and their lower end by means of partitions at least between groups of filter elements, in order to provide for a raw gas flow with a marked flow component from the top to the bottom. Due to the lower flow connection of the flow passages, a pressure differential becomes effective in the flow passage with the blocked filter element or the blocked group of filter elements, which pressure differential leads to a downwardly directed raw gas flow which is sufficient to entrain the dust particles blown off despite the missing sucking off of raw gas by the filter element or the group of filter elements.

When the filter elements inside groups should be actuated jointly, it is not necessary to provide each filter element with a separate shut-off means or with a separate valve for the connection of compressed air. The filter elements combined to groups may open in groups into a collecting passage, which on the one hand is connected to the clean gas shaft via a shut-off means and on the other hand is connected to the compressed-air source via a valve. By means of such measure, the construction of the dust separator is considerably simplified.

However, the filter elements combined to groups disposed one above the other or disposed one beside the other also provide for another simple construction, which consists in that to the filter elements or groups of filter elements a carriage is associated, which is guided in the clean gas shaft and can be moved from filter element to filter element or from group of filter elements to group of filter elements, and which has an actuatable shut-off means for a filter element or a group of filter elements and a compressed-air connection for the compressed-air source, which can be controlled via a valve and opens inside the shut-off means. By means of this carriage, the filter elements can thus be shut off individually or in groups and be subjected to compressed air, so that for the successive cleaning of the groups of filter elements the carriage must merely be moved from filter element to filter element or from group of filter elements to group of filter elements. When the filter elements are disposed one above the other, the carriage must be moved from the top to the bottom, and when the filter elements are disposed one beside the other, the carriage must be moved along the row of filter elements. The shut-off means for the filter elements of one group may consist in a comparatively simple way of a lock common to all filter elements of a group, which lock is sealingly urged against the partition between the clean gas shaft and the raw gas shaft. The filter elements protrude through this partition into the raw gas shaft.

To promote the discharge of dust particles blown off from the filter surfaces of the blocked filter elements, at least one blower for the raw gas stream to be switched on in dependence on the actuation of the shut-off means may be associated to the raw gas shaft, so that during the shut-off of a filter element the raw gas flow is reinforced by the blower at least in the vicinity of this filter element.

BRIEF DESCRIPTION OF THE DRAWING

The method in accordance with the invention will be explained in detail with reference to the drawing, wherein:

FIG. 8 shows an inventive dust separator in accordance with a further embodiment in a vertical section;

FIG. 9 shows a section along line IX—IX of FIG. 8, and

DETAILED DESCRIPTION OF PREFERRED EMBODIMENTS

Figure 1:
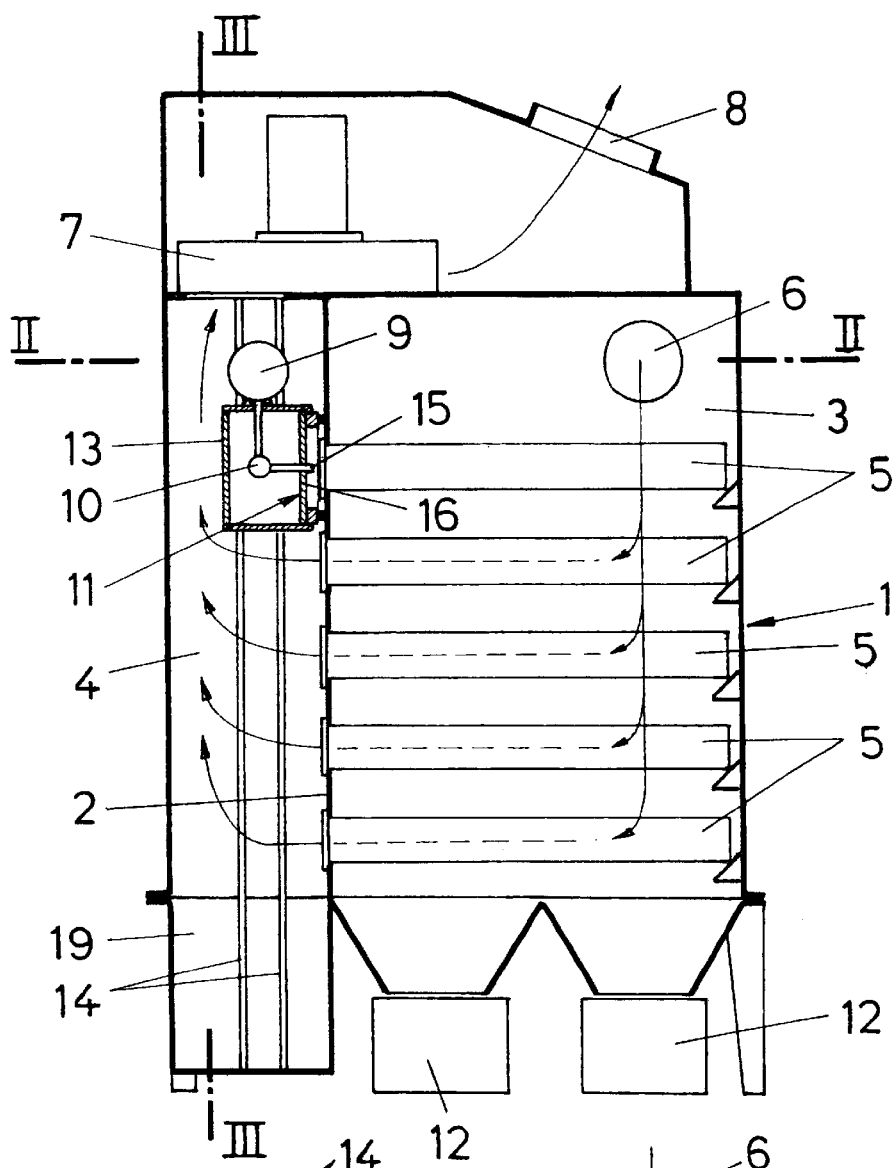
FIG. 1 shows an inventive dust separator in a simplified vertical section.
Figure 2:
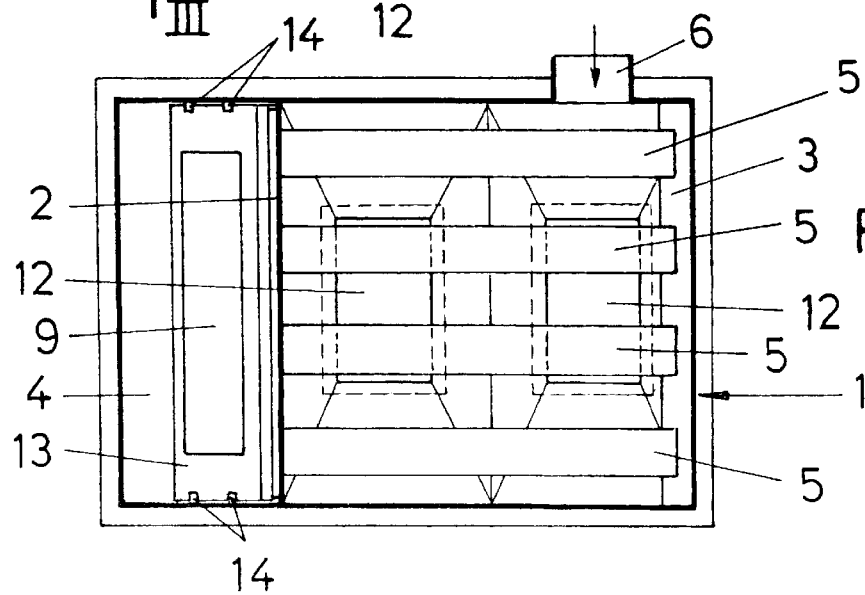
FIG. 2 shows a section along line II—II FIG. 1.
Figure 3:
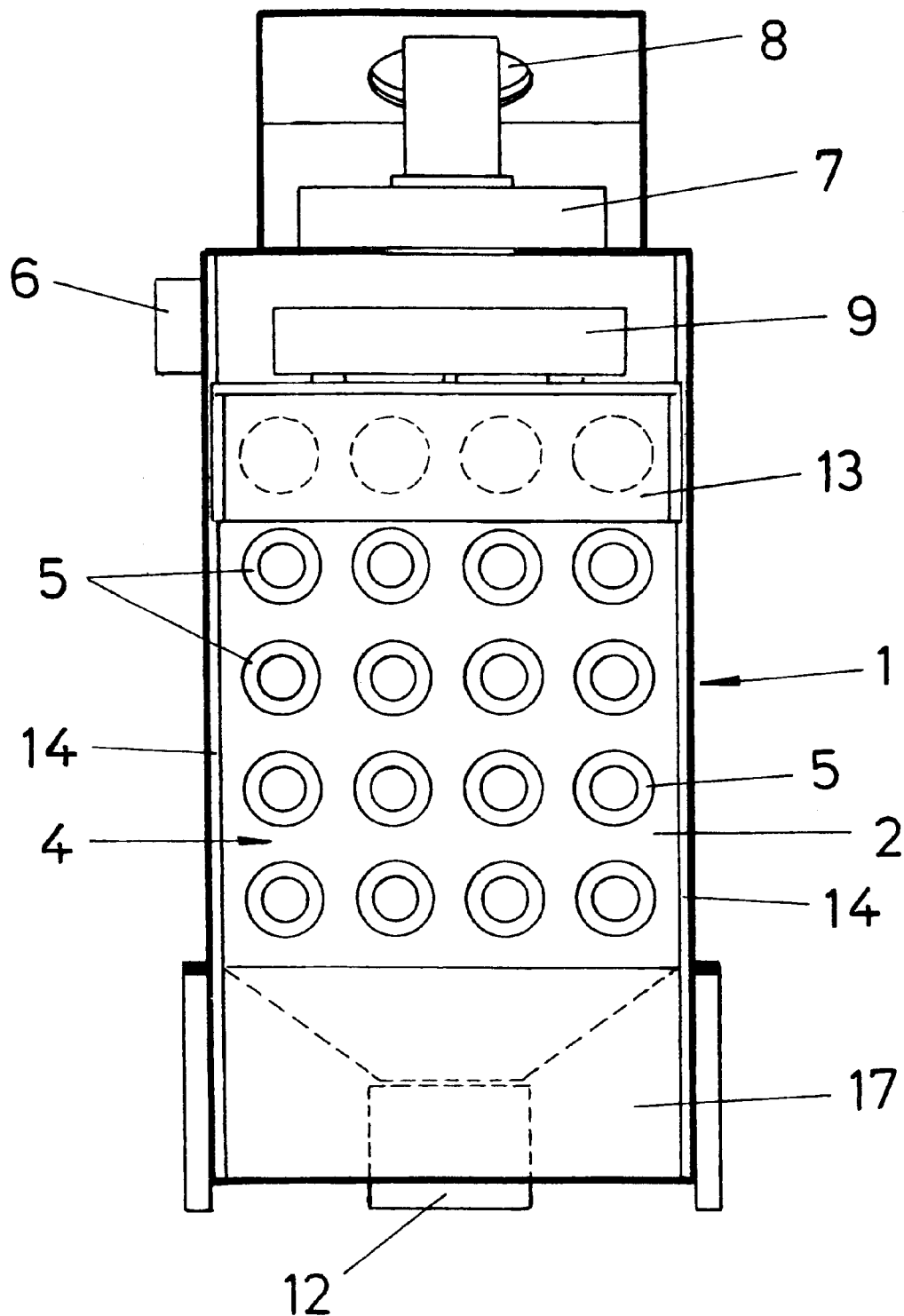
FIG. 3 shows a section along line III—III of FIG. 1.
Figure 4:
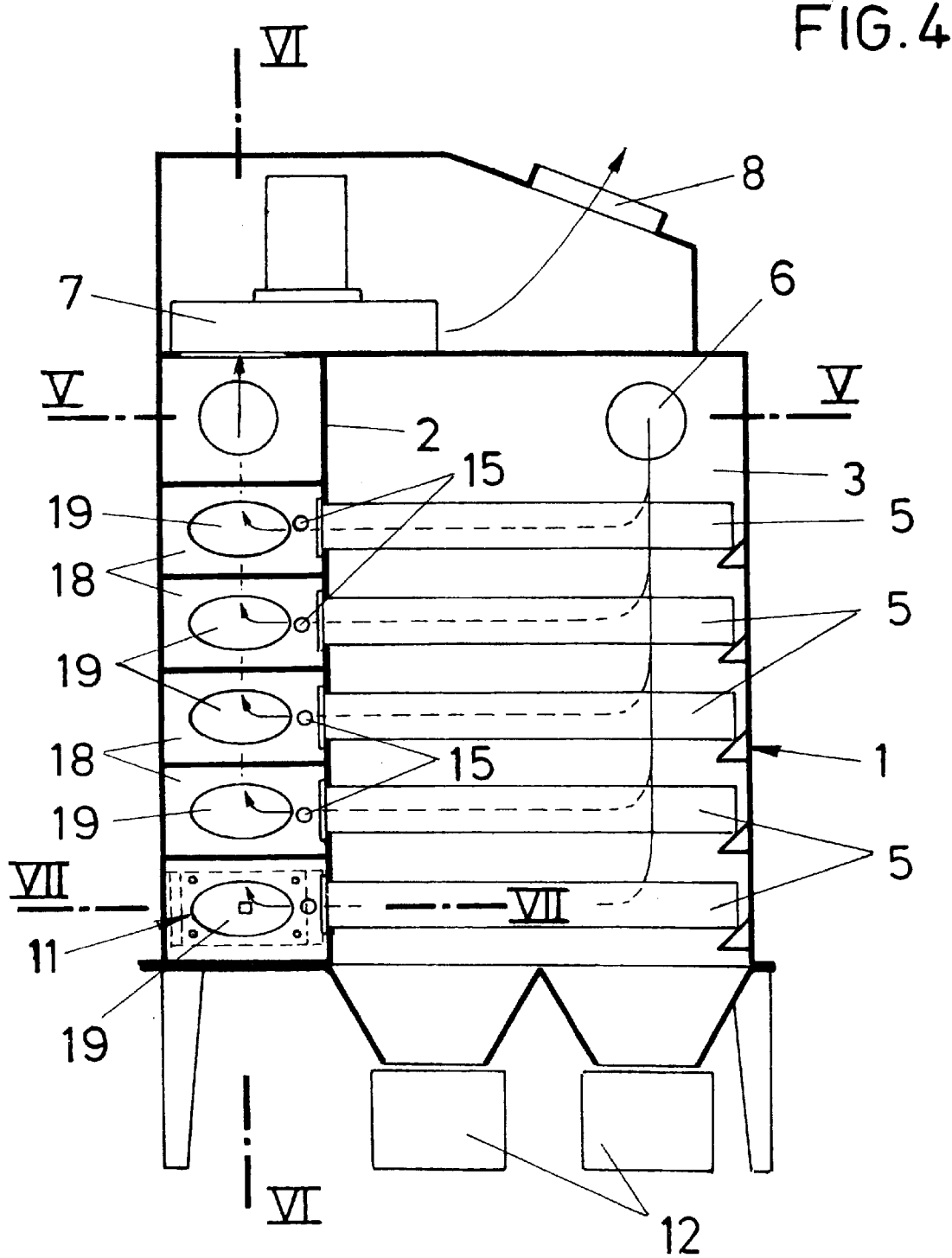
FIG. 4 shows a vertical section through a modified embodiment of an inventive dust separator.
Figure 5:
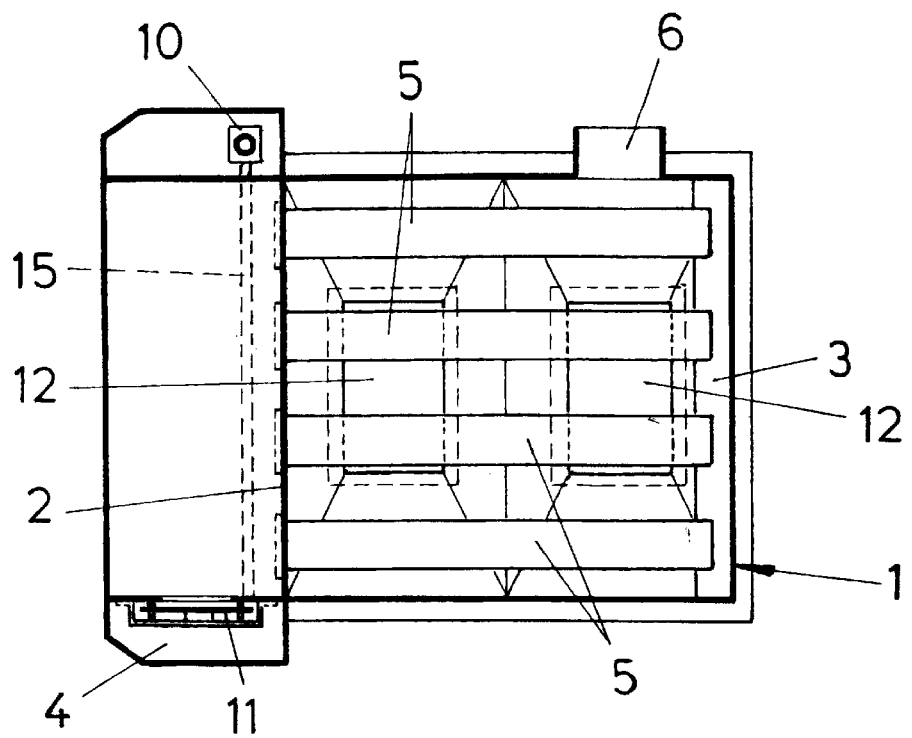
FIG. 5 shows the dust separator in accordance with FIG. 4 in a section along line V—V of FIG. 4.
Figure 7:
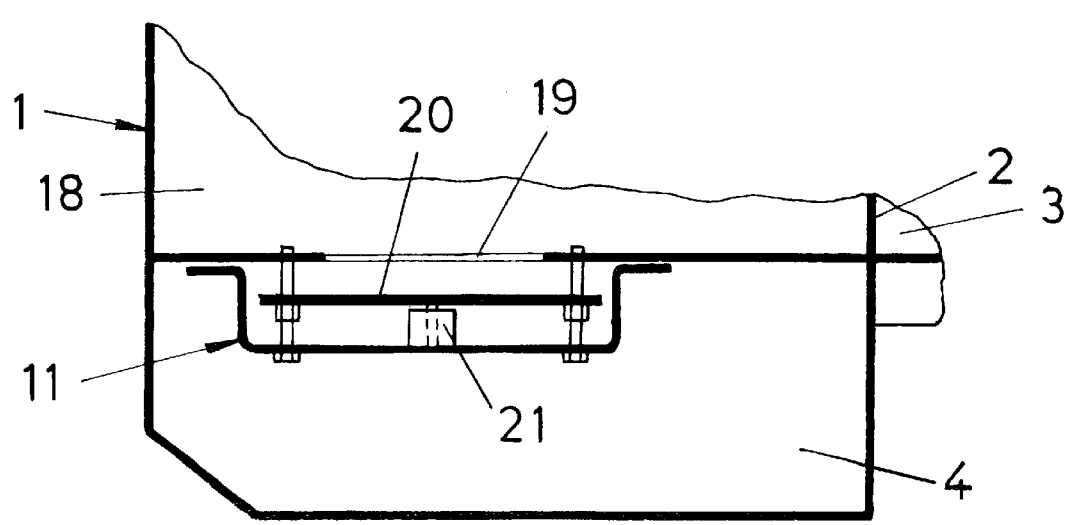
FIG. 7 shows a section along line VII—VII of FIG. 4 on an enlarged scale.
Figure 6:
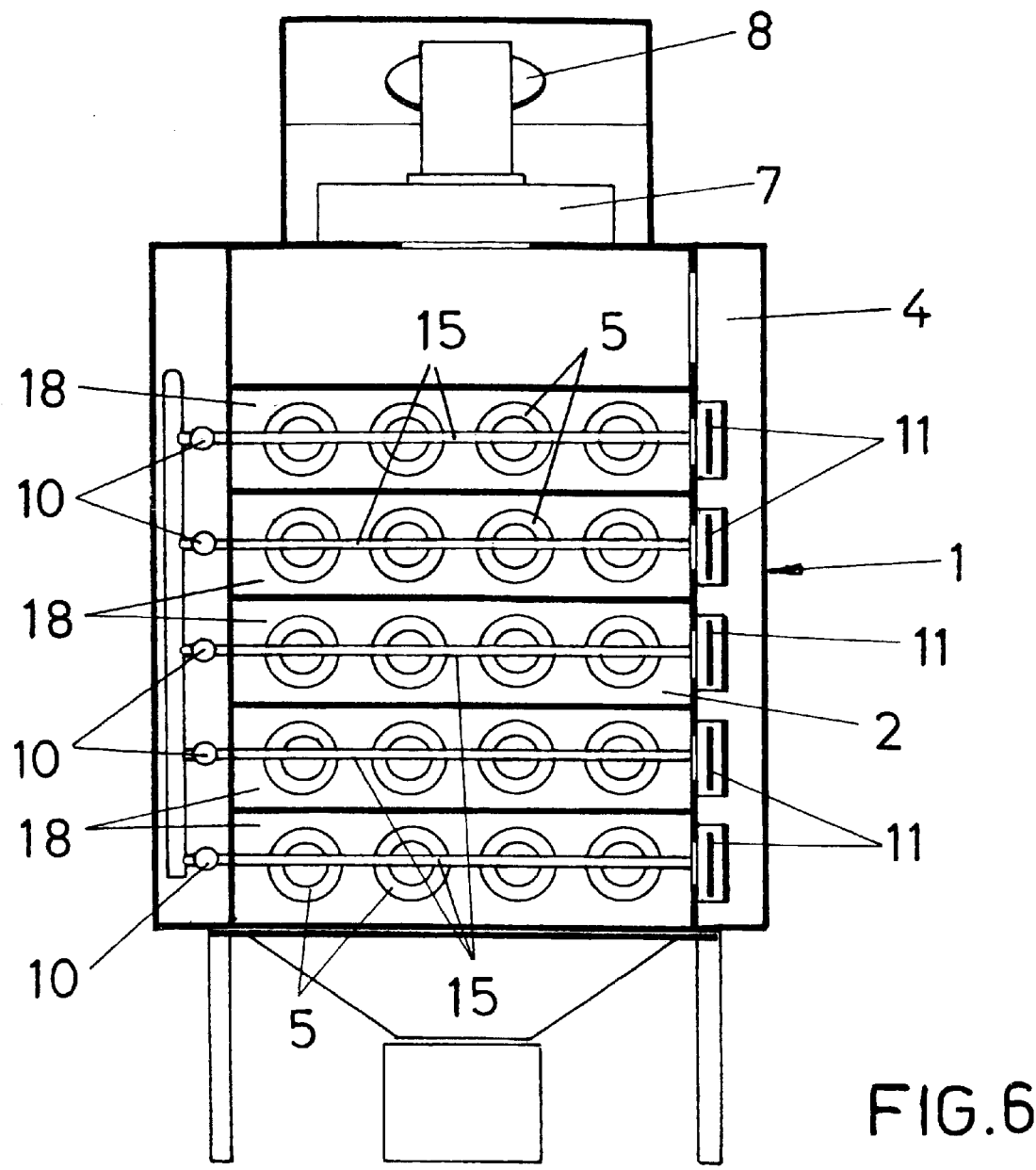
FIG. 6 shows a section along line VI—VI of FIG. 4.

The dust separator in accordance with the embodiment shown in FIGS. 1 to 3 substantially consists of a housing 1, which by means of a partition 2 is divided into a raw gas shaft 3 and a clean gas shaft 4. From the side of the clean gas shaft 4, filter elements 5 have been inserted into the raw gas shaft 3 through the partition 2, which filter elements are disposed in rows one above the other and for instance consist of filter cartridges. The shape of the filter elements 5 is, however, not decisive, but it is merely important that the raw gas stream, which enters through an upper raw gas connection 6 into the raw gas shaft 3, can get into the filter elements 5 only through the filter surfaces enclosing the filter elements 5 and into the clean gas shaft 4 through the filter elements 5, from which clean gas shaft the clean gas stream is withdrawn via a suction blower 7, in order to leave the housing 1 through a clean gas outlet 8. During the passage of the raw gas flow through the filter surfaces of the filter elements 5, the dust particles are retained by the filter surfaces, which are thus increasingly clogged by the deposited dust particles. For this reason, the filter surfaces of the filter elements 5 must be cleaned in certain intervals. The time intervals between such cleaning of the filter may be chosen in dependence on the respectively occurring pressure losses, when a greatly varying dust loading of the raw gases must be expected. When the dust loading of the raw gases remains approximately the same, the cleaning of the filter may also be performed in predetermined intervals.

To avoid that the operation of the filter must be interrupted during the cleaning of the filter, the filter elements 5 are combined to groups row by row, and via a valve 10 are briefly connected in groups with a compressed-air source 9, for instance a compressed-air cylinder, so that by means of the pulses of compressed air, which become effective in the filter elements 5, the attached dust particles are blown off from the filter surfaces against the raw gas flow. During the brief pressurization of the filter elements 5, the flow connection between the filter elements 5 and the clean gas shaft 4 is interrupted, namely by means of a shut-off means 11, so that the fine dust particles blown off from the filter surfaces only to a small extent are entrained by the raw gas stream flowing around the outside of the filter elements 5 because the filter elements 5 are blocked, and are moved away from the filter surfaces of the blocked filter elements 5 with the effect that after the shut-off means 11 has been opened, the dust particles blown off can no longer be carried to the cleaned filter surfaces with the partial raw gas streams now again flowing through the previously blocked filter elements 5. Since the raw gas flows through the raw gas shaft 3 from the top to the bottom, the dust particles blown off from the blocked filter elements 5 of one row are moved downwards, where they partly attach to the filter surfaces of the filter elements 5 of the rows of filter elements disposed below. When the filter elements 5 are cleaned row by row from the top to the bottom in the manner described above, the dust particles blown off from the filter surfaces of the filter elements 5 are moved downwards in the raw gas shaft 3 step by step, until they settle in the vicinity of the ground of the raw gas shaft 3 in dust collecting tanks 12. With such an arrangement of the filter elements 5 it is thus decisive for the cleaning of the filter that the filter elements 5 are progressively dedusted at least in groups one after the other from the top to the bottom through the filter elements 5 with blocked raw gas flow.

For the constructive solution of this object a carriage 13 is provided in accordance with the embodiment shown in FIGS. 1 to 3, which carriage is vertically movably mounted in the clean gas shaft 4 on a vertical guideway 14. This carriage 13 carries the shut-off means 11 for the filter elements 5 of a row of filter elements as well as the compressed-air source 9 with the compressed-air connection 15 extending through the shut-off means 11 and connected with the compressed-air source 9 via the valve 10, as is indicated in FIG. 1. In the carriage position in accordance with FIG. 1, the uppermost of the rows of filter elements can be cleaned. For this purpose, the shutoff means 11 is actuated, which consists for instance of a lock 16 extending over the entire row of filter elements, which lock is sealingly urged against the partition 2 by means of an actuator not represented, so that the flow connection between the filter elements 5 of the uppermost row of filter elements and the clean gas shaft 4 is interrupted. Since the pressure connection 15 extends through the lock 16 and therefore opens inside the shut-off means 11, the filter elements 5 of the uppermost row can briefly be subjected to compressed air by opening the valve 10.

After the uppermost row of filter elements has been cleaned, the carriage 13 is moved further downwards by one row of filter elements after the shut-off means 11 has been opened, in order to clean the filter elements 5 of this row in the same way. The rows of filter elements are thus progressively liberated from dust from the top to the bottom, which dust is moved downwards step by step. Upon dedusting the filter elements 5 of the bottommost row of filter elements, the carriage 13 is lowered to a waiting position below the bottommost row of filter elements, so as not to impair the operation of the filter. To this end, the clean gas shaft 4 has been expanded downwards to form a receiving space 17 for the carriage 13.

In the embodiment shown in FIGS. 4 to 7, the cleaning of the filter elements 5 row by row has been solved in a different way. The filter elements 5 of a row do not open directly into a clean gas shaft adjoining the partition 2, but into collecting passages 18 associated to each row of filter elements, which collecting passages adjoin the end face of the clean gas shaft 4, namely each via a shut-off means 11. In accordance with FIG. 7, these shut-off means 11 consist of a lock 20 covering the through holes 19 between the collecting passage 18 and the clean gas shaft 4, which lock can sealingly be urged against the through hole 19 by means of an actuator 21, for instance an electromagnet. To the individual collecting passages 18 there should also be associated one compressed-air connection 15 each to be actuated via a valve 10, in order to be able to connect the collecting passage 18 and the filter elements 5 attached thereto with a compressed-air source via the valve 10.

The mode of function of the dust separator in accordance with the embodiment shown in FIGS. 4 to 7 corresponds to the one shown in FIGS. 1 to 3. For cleaning the filter, the collecting passage 18 for the uppermost row of filter elements is first of all separated from the clean gas shaft 4 via the shut-off means 11 associated to this collecting passage 18, before via the associated valve 10 and the compressed-air connection 15 compressed air is briefly applied onto the filter elements 5 attached to this collecting passage 18. After the dust particles have been blown off from the filter elements 5 of the uppermost row of filter elements, the uppermost collecting passage 18 is again connected to the clean gas shaft and the shut-off means 11 of the collecting passage 18 disposed below is actuated, in order to again progressively clean the rows of filter elements from the top to the bottom by individually actuating one after the other the shut-off means 11 or the valves 10 of the collecting passages 18 via a corresponding control means. The dust blown off is collected in dust collecting tanks 12.

Figure 10:
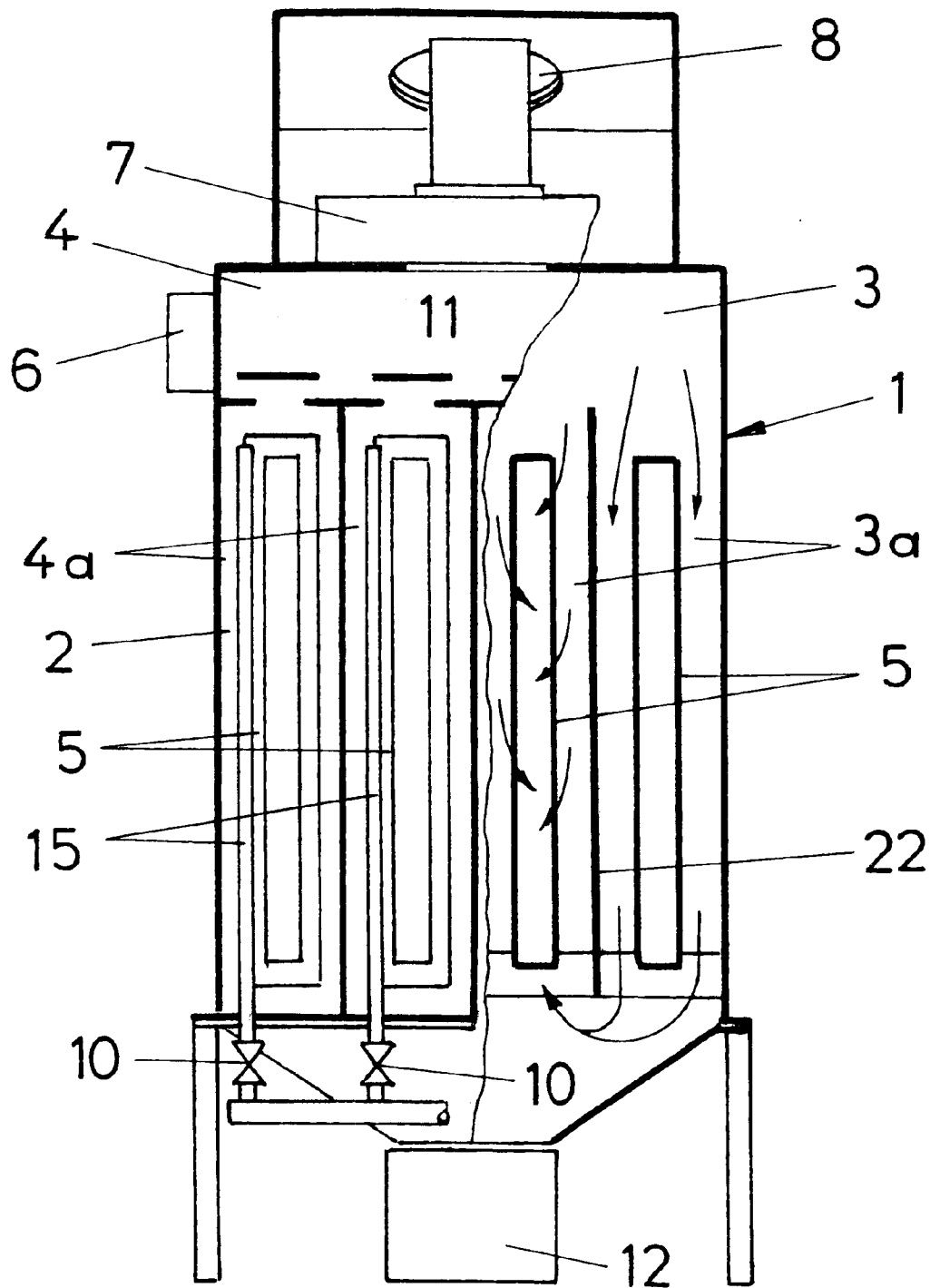
FIG. 10 shows a section along line X—X of FIG. 9.

In the embodiment shown in FIGS. 8 to 10 no filter cartridges are used, but plate-shaped filter elements 5 are inserted in the partition 2 between the raw gas shaft 3 and the clean gas shaft 4. By means of partitions 22 between the filter elements 5, the raw gas shaft 3 is divided into flow passages 3a, which are associated to these filter elements 5 and are open at the top and at the bottom, as can be taken in particular from FIG. 10. Correspondingly, the clean gas shaft 4 is divided into clean gas passages 4a associated to the individual filter elements 5, which clean gas passages are connected to the common clean gas shaft 4 via one shut-off means 11 each. Since compressed air from a compressed-air source can also be applied individually to the clean gas passages 4a via compressed-air connections 15 and control valves 10, an application of compressed air onto the filter elements 5 is again possible during the closure of the flow connection between the respective filter element 5 and the clean gas shaft 4. For this purpose it is merely necessary to actuate the shut-off means 11 of the filter element 5 to be cleaned and to open the valve 10 for the compressed-air connection 15, so that the related pressurization of the filter element 5 effects a blowing off of dust particles from the filter surfaces of this filter element 5. Although the flow of raw gas through the blocked filter element 5 is prevented, a raw gas flow directed from the top to the bottom is obtained inside the flow passage 3a of the blocked filter element 5, because the flow passages 3a are in flow connection with each other at their lower end, so that the decrease in pressure in the flow passages 3a adjacent the blocked filter element 5 also reaches the flow passage 3a of the blocked filter element 5 and effects a corresponding raw gas flow along the blocked filter element 5, as it was indicated by corresponding flow arrows for the filter element 5 to the extreme right in FIG. 10. By means of this raw gas flow, the dust particles blown off are moved downwards to the dust collecting tanks 12.

It need probably not be emphasized particularly that the successive shut-off of the filter elements 5 disposed one beside the other and the pressurization thereof can also be performed via a carriage similar to the embodiment shown in FIGS. 1 to 3. The carriage must, however, be moved in horizontal direction from filter element 5 to filter element 5 along the row of filter elements.

What is claimed is:

1. A method of cleaning a dust separator comprising a vertical raw gas shaft, a vertical clean gas shaft and groups of at least one filter element transversely extending into the raw gas shaft, which method comprises the steps of
   (a) forcing a raw gas stream to flow downwardly through the vertical raw gas shaft,
   (b) connecting the filter elements to the clean gas shaft to deflect the raw gas stream by the filter elements to the clean gas shaft while the filter elements separate dust particles from the raw gas stream and the dust particles are deposited on the filter elements,
   (c) successively subjecting one group after another to at least one pulse of compressed air to blow off the deposited dust particles into the raw gas shaft, and
   (d) disconnecting the group of at least one filter element which is subject to at least one pulse of compressed air from the clean gas shaft to interrupt the flow of the raw gas stream from the disconnected group to the clean gas shaft while the continuing downwardly flowing forced raw gas stream flows around the disconnected group.

2. The method of claim 1, comprising the steps of arranging the groups of at least one filter element one above the other, and the groups are successively subjected to at least one pulse of compressed air from top to bottom.

3. The method of claim 1, comprising the steps of arranging the groups of at least one filter element side by side, and dividing the groups by partitions to provide a partial raw gas stream associated with each group.

4. A dust separator comprising
   (a) vertical raw gas shaft having a raw gas input at an upper end thereof to provide a downwardly flowing raw gas stream,
   (b) a vertical clean gas shaft having a suction blower,
   (c) groups of at least one filter element transversely extending into the raw gas shaft, the filter elements being connected to the clean gas shaft for deflecting the raw gas stream to the clean gas shaft, the suction blower causing a downwardly flowing forced flow of raw gas, the filter elements separating dust particles from the raw gas stream and the dust particles being deposited on the filter elements,
   (d) a source providing one group after another with at least one pulse of compressed air to blow off the deposited dust particles into the raw gas shaft,
   (e) at least one valve between the source of compressed air and the groups of at least filter element, and
   (f) at least one shut-off means for disconnecting the group of at least one filter element which is subject to at least one pulse of compressed air from the clean gas shaft to interrupt the flow of the raw gas stream from the disconnected group to the clean gas shaft while the continuing downwardly flowing forced flow of raw gas flows around the disconnected group.

5. The dust separator of claim 4, wherein the groups of at least one filter element are arranged one above the other.

6. The dust separator of claim 5, wherein each group of at least one filter element is connected to a collecting passage, the shut-off means being arranged between the collecting passages and the clean gas shaft, and a respective one of the valves being arranged between the a respective one of the collecting passages and a respective one of the groups of at least one filter element.

7. The dust separator of claim 5, further comprising a carriage vertically guided in the clean gas shaft for displacement in alignment with respective ones of the groups of at least one filter element, the carriage holding the shut-off means for disconnecting the group aligned with the carriage and the valve.

8. The dust separator of claim 4, wherein the groups of at least one filter element are arranged side by side in the draw gas shaft, further comprising partitions between the groups, the partitions dividing the raw gas shaft into flow passages in communication with each other at upper and lower ends thereof.

* * * * *